May 6, 1924.
A. M. EWING
1,492,559
RECORDING APPARATUS
Filed Sept. 2, 1922    2 Sheets-Sheet 2
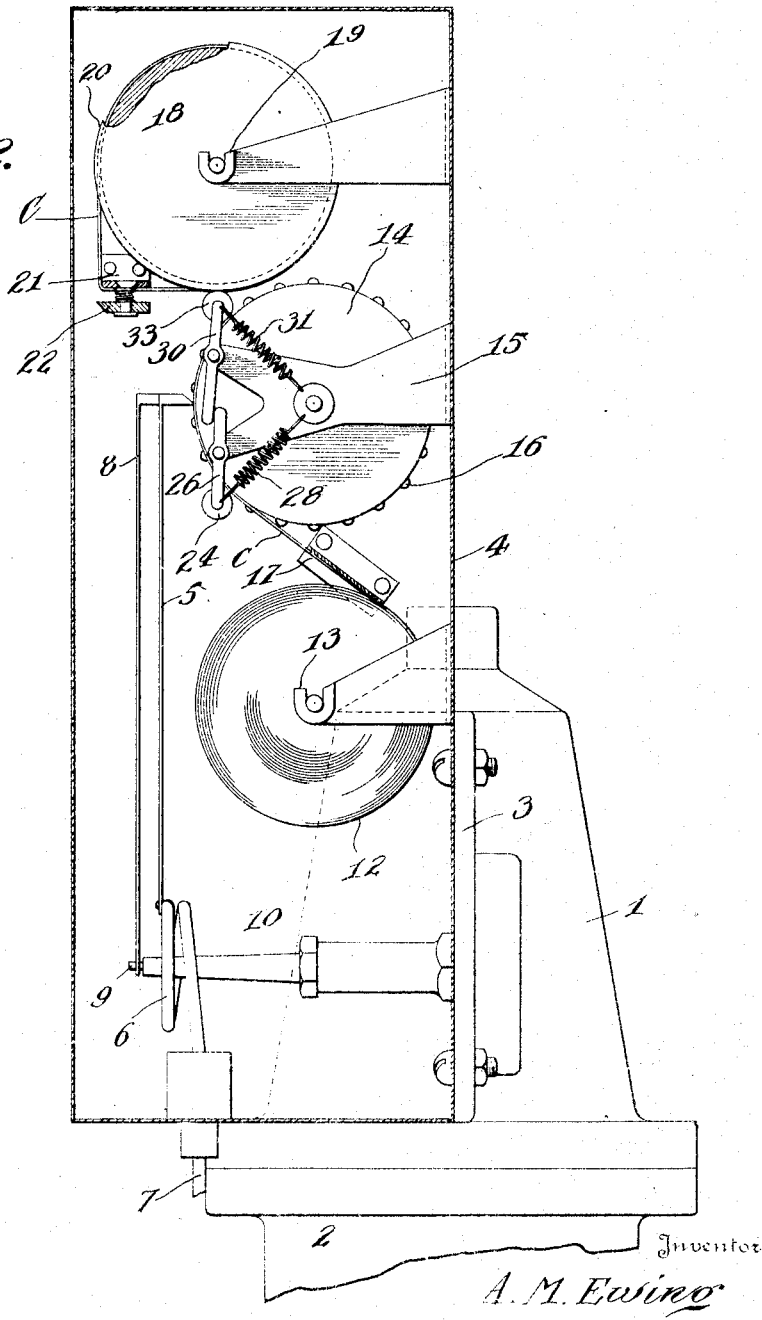

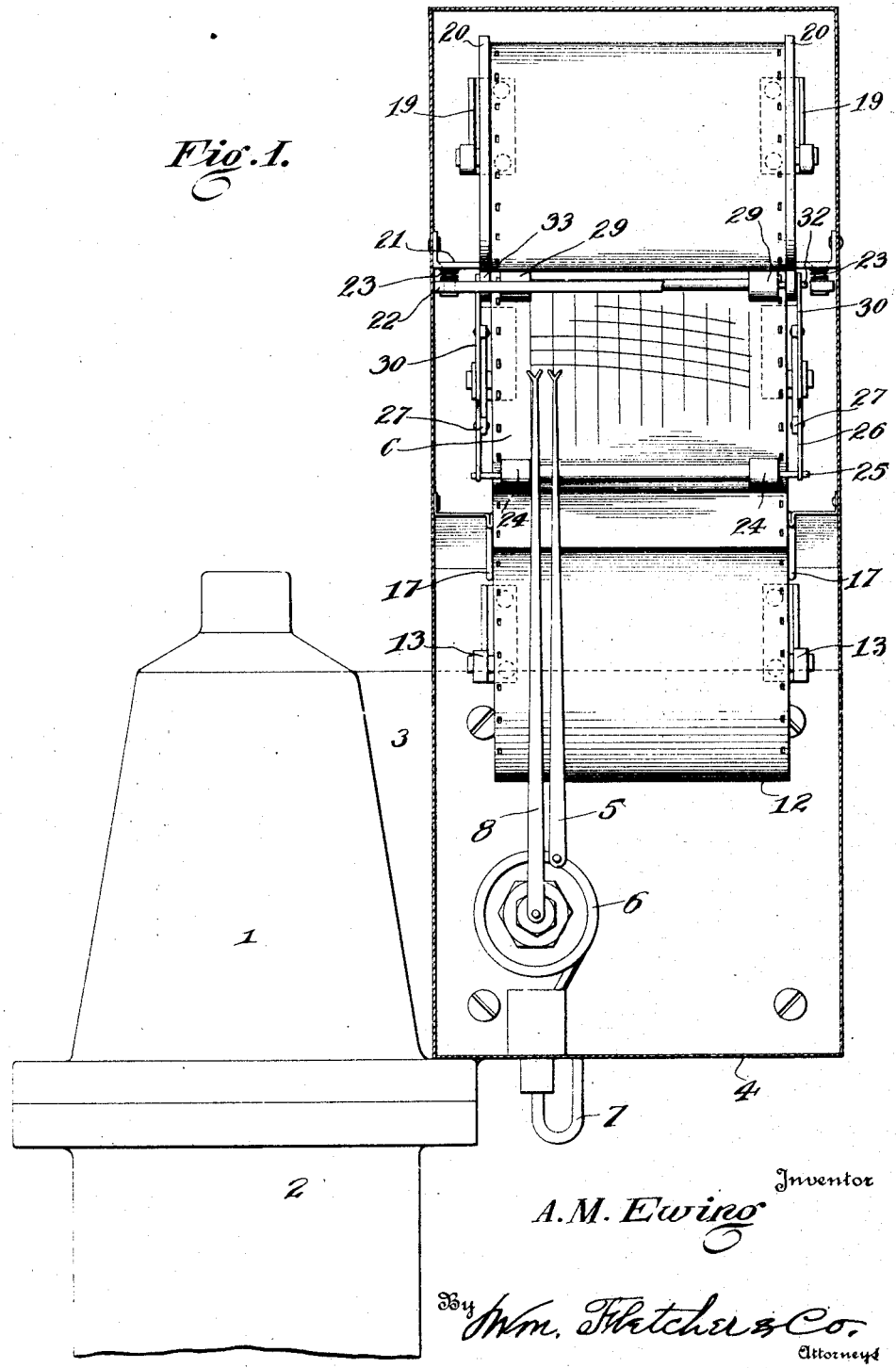

Patented May 6, 1924.

1,492,559

UNITED STATES PATENT OFFICE.

ADLAI M. EWING, OF IOLA, KANSAS.

RECORDING APPARATUS.

Application filed September 2, 1922. Serial No. 585,933.

*To all whom it may concern:*

Be it known that I, ADLAI M. EWING, a citizen of the United States, residing at Iola, in the county of Allen and State of Kansas, have invented certain new and useful Improvements in Recording Apparatus; and I do hereby declare the following to be a full, clear, and exact description of the invention, such as will enable others skilled in the art to which it appertains to make and use the same.

This invention relates to recording apparatus designed primarily for use in connection with gas meters but is not limited in its application to such use. The invention has for its object to provide a recording apparatus which will permit the use of a continuous tape instead of the circular chart which is customarily applied. The invention consists in the mechanism for supporting the tape and for driving the same at a uniform rate of speed past the marking pens.

The various features of novelty and invention will appear from the detailed description taken in connection with the accompanying drawings forming part of this specification, and will be defined in the appended claim.

In the drawings—
Figure 1 is a front elevation of the improved recording means in connection with a well known type of meter, and Fig. 2 is a side elevation thereof, parts being in section.
Referring now to the drawings, 1 designates a removable top on a gas meter 2 and 3 a bracket extending laterally from the said top. Affixed to this bracket 3 is a housing or support 4 in which the recording mechanism is mounted.

The recording device is adapted to record both static and differential pressures. 5 indicates the static pen which at its lower end is secured to a coil tube 6, this tube being connected to a pipe 7 which is in connection with the up-stream side of the meter, as will be readily understood.

The differential pen is indicated at 8 and is affixed at its lower end to a shaft 9 which projects from a bearing 10 projecting laterally of the meter. This shaft is actuated by a differential mechanism contained within the top 1.

The chart or tape with which the pens 5 and 8 are adapted to cooperate is indicated at C and is an elongated member adapted to be unreeled from a spool 12 which is suitably supported in arms 13 projecting from the housing 4. This tape is adapted to be held against a portion of the surface of a drum 14, this drum constituting a driving member and being adapted to be driven by suitable clock work not shown. The drum 14 is suitably supported in lateral supports 15 and is provided with spurs 16 which are adapted to enter perforations in the sides of the tape whereby the tape or chart will be positively driven by the drum. Disposed between the spool 12 and drum 14 are guides 17 for properly guiding the tape from the spool 12 onto the drum 14.

The tape or chart as it leaves the drum 14 is wound on a reel 18 which is removably mounted in arms 19 extending laterally from the housing 4. This reel is provided with flanges 20 which not only guide the tape onto the reel, but also serve a purpose hereinafter mentioned.

Mounted adjacent the reel 18 is a means for severing the chart or tape. 21 is a shoe or bar extending across the housing and over which the chart must pass as shown in Fig. 2. 22 is a knife which is mounted on bar 21 in a manner to permit said knife to be moved or tilted by hand toward the bar 21 for the purpose of holding or clamping the chart during severing. The knife is normally maintained in spaced relation from the bar 21 by means of springs 23 at the ends of the knife and bar.

The tape or chart C as it passes from the spool 12, at its point of contact with the drum 14 is held against the drum by means of rollers 24 mounted on a shaft 25, the ends of which are mounted in arms 26 pivoted to fingers 27 extending from the support 15 on which the drum 14 is mounted. The rollers are drawn toward the drum by tension springs 28 as shown in Fig. 2. At some distance removed from the rollers 24 is another set of rollers 29 holding the chart or tape against drum 14, arms 30 supporting these rollers and springs 31 acting to draw the rollers toward the drum.

The rollers 29 are affixed on a shaft 32 and also affixed to said shaft are rollers 33 which are in frictional contact with the flanges 20 on the reel 18. These rollers 33 are adapted to drive the reel 18 so as to wind up the tape or chart C onto said reel.

It will now be seen that drum 14 serves as a table or support for the tape or chart while it is being marked or printed upon by the pens 5 and 8 and that it also serves as a means for translating the chart past the pens. This I consider an important feature of the invention inasmuch as the drum by being connected to or directly driven by the clock work, will rotate at a uniform speed. The manner of driving the reel is also an important feature of the invention inasmuch as the arrangement is simple and imparts constant rotation to said reel.

It will of course, be understood that the pens 5 and 8 swing laterally across the chart and that the latter is suitably calibrated, as shown.

By providing an endless tape or chart instead of a circular disk, the apparatus will require less attention inasmuch as changing of charts at close periods such as every twentyfour hours is not necessary. When it is desired to remove that part of the chart on the reel 18 which has a record thereon, it is merely necessary to tear off the required portion and this may be effected without disturbing the operation of the recording aparatus. For example, when a section of chart is to be cut off it is merely necessary to unfasten the same from the reel 18 and draw it back and sever it on the knife blade 22. As will be remembered, the knife is preferably pressed against the back of shoe 21 to firmly hold the tape during the operation of severing. The tape which is cut off will usually represent a period of twenty-four hours. After the record has been severed it is merely necessary to again attach the end of the chart to the reel as will be understood.

What I claim is:

In recording apparatus, the same being provided with a strip of paper marked to represent intervals of time, the combination with a clockwork mechanism, of a driving drum engaging said strip of paper and driven by said clockwork, a receiving drum on which the said strip is wound after leaving the driving drum, a shaft between said drums, rollers on said shaft about which said paper strip is looped prior to being wound on the receiving drums and which hold said paper strip against the driving drum, and means on said shaft engaging both said drums to drive the receiving drum from the driving drum.

In testimony whereof I affix my signature.

ADLAI M. EWING.